United States Patent
Van Den Bogerd et al.

(10) Patent No.: US 11,524,432 B2
(45) Date of Patent: Dec. 13, 2022

(54) USE OF A POLYCARBONATE COMPOSITION

(71) Applicant: SABIC GLOBAL TECHNOLOGIES B.V., Bergen op Zoom (NL)

(72) Inventors: Joshua Arie Van Den Bogerd, Geleen (NL); Cornelis Jan Maria Rijken, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 472 days.

(21) Appl. No.: 16/613,328

(22) PCT Filed: May 9, 2018

(86) PCT No.: PCT/EP2018/061977
§ 371 (c)(1),
(2) Date: Nov. 13, 2019

(87) PCT Pub. No.: WO2018/210652
PCT Pub. Date: Nov. 22, 2018

(65) Prior Publication Data
US 2020/0147842 A1    May 14, 2020

(30) Foreign Application Priority Data
May 17, 2017    (EP) ..................................... 17171555

(51) Int. Cl.
| C08G 64/04 | (2006.01) |
| B29C 45/00 | (2006.01) |
| C08K 5/1515 | (2006.01) |
| C08K 5/526 | (2006.01) |
| C08K 5/527 | (2006.01) |
| C08L 63/00 | (2006.01) |
| B29K 69/00 | (2006.01) |
| B29L 31/44 | (2006.01) |

(52) U.S. Cl.
CPC .......... *B29C 45/0001* (2013.01); *C08G 64/04* (2013.01); *C08K 5/1515* (2013.01); *C08K 5/526* (2013.01); *C08K 5/527* (2013.01); *C08L 63/00* (2013.01); *B29K 2069/00* (2013.01); *B29L 2031/443* (2013.01); *B29L 2031/448* (2013.01)

(58) Field of Classification Search
USPC ............................ 264/328.12; 528/196, 198
See application file for complete search history.

(56) References Cited

U.S. PATENT DOCUMENTS

| 4,066,611 A | 1/1978 | Axelrod |
| 2006/0263547 A1 | 11/2006 | Cojocariu et al. |
| 2014/0350148 A1 | 11/2014 | Takimoto et al. |
| 2015/0070933 A1 | 3/2015 | Van Den Bogerd et al. |

FOREIGN PATENT DOCUMENTS

| EP | 0885929 A1 | 12/1998 |
| WO | 2014191942 A1 | 12/2014 |

OTHER PUBLICATIONS

International Search Report; International Application No. PCT/EP2018/061977; International Filing Date: May 9, 2018; dated Jul. 20, 2018; 4 pages.
Written Opinion; International Application No. PCT/EP2018/061977; International Filing Date: May 9, 2018; dated Jul. 20, 2018; 7 pages.

*Primary Examiner* — Terressa Boykin
(74) *Attorney, Agent, or Firm* — Cantor Colburn LLP

(57) ABSTRACT

In an embodiment, a method for the manufacture of an injection molded article in an injection mold comprises at least one flow length of at least 50 cm, the flow length being defined as the shortest distance between a point of injection in the mold and an inner mold wall, the method comprising injection molding a polycarbonate composition comprising an aromatic polycarbonate, from 0.01 wt. % to 0.30 wt. % based on the weight of the polycarbonate composition of an epoxy additive having at least two epoxy groups per molecule, and from 0.01 wt. % to 0.30 wt. % based on the weight of the polycarbonate composition of a phenolic diphosphite derived from pentaerythritol.

19 Claims, 1 Drawing Sheet

USE OF A POLYCARBONATE COMPOSITION

CROSS REFERENCE TO RELATED APPLICATIONS

This application is a 371 of International Application No. PCT/EP2018/061977, filed May 9, 2018, which is incorporated by reference in its entirety, and which claims priority to European Application Serial No. 17171555.0 filed May 17, 2017.

The present invention relates to the use of a polycarbonate composition comprising an aromatic polycarbonate, from 0.01 wt. % to 0.30 wt. % of an epoxy additive having at least two epoxy groups per molecule and from 0.01 wt. % to 0.30 wt. % of a phenolic diphosphite derived from pentaerythritol in an injection moulding process for the manufacture of an injection moulded article.

The present invention further relates to the use of a polycarbonate composition comprising aromatic polycarbonate manufactured by an interfacial process and having a melt volume rate (MVR) of from 1-10 cm$^3$/10 min (ISO 1133, 300° C., 1.2 kg) and from 0.01-0.30 wt. % of an epoxy additive of the formula

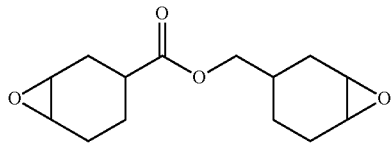 [SMILES: O=C(OCC1CCC2OC2C1)C1CCC2OC2C1]

and from 0.01-0.30 wt. % of 2,4-dicumylphenyl pentaerythritol diphosphite in an injection moulding process.

The present invention further relates to a method for the manufacture of an injection moulded article in an injection mould comprising at least one flow length of at least 50 cm, the flow length being defined as the shortest distance between a point of injection in the mould and an inner mould wall.

The present invention further relates to an article comprising or consisting of a polycarbonate composition comprising aromatic polycarbonate, from 0.01 wt. % to 0.30 wt. % based on the weight of the polycarbonate composition, of an epoxy additive having at least two epoxy groups per molecule and from 0.01 wt. % to 0.30 wt. % based on the weight of the polycarbonate composition, of a phenolic diphosphite derived from pentaerythritol.

The aforementioned use is known from the prior art. For example WO2014/191942 discloses a plastic article formed from a thermoplastic composition comprising a polycarbonate having repeating structural carbonate units according to the formula

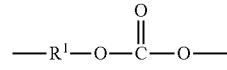

in which at least 60 percent of the total number of R$^1$ groups contain aromatic moieties and the balance thereof are aliphatic, alicyclic, or aromatic; the polycarbonate having been prepared through an interfacial polymerization process from BPA monomer having an organic purity higher than 99.70% by weight and having a hydroxyl content lower than 150 ppm by weight;

0.01 wt. % to 0.30 wt. %, based on the total weight of the thermoplastic composition, of an epoxy additive having at least two epoxy groups per molecule; and 0.01 wt. % to 0.30 wt. %, based on the total weight of the thermoplastic composition, of a phenolic diphosphite derived from pentaerythritol; wherein the thermoplastic composition has a sulfur content lower than 2 ppm, and wherein the thermoplastic composition exhibits a dE (2000 hrs.) value of less than 2.0 after 2000 hours of heat aging at 130° C., measured according ISO 11664-4:2008(E)/CIE S o 14-41E:2007 using CIE illuminant D65 and a 2.5 mm thick moulded plaque of the thermoplastic composition. The targeted application in this publication are lenses and light guides and the purpose of the invention of WO 2014/191942 was to provide a polycarbonate composition that exhibits both a good initial color as well as a good long term color stability.

EP0885929 discloses an aromatic polycarbonate composition having improved hydrolytic stability, while maintaining good processing properties, and which can be formed under venting without the necessity of predrying the polycarbonate composition, said composition comprising an aromatic polycarbonate and an additive comprising in combination at least one bis(aralkylphenyl) pentaerythritol diphosphite and at least one epoxy having an on-set temperature of greater than 255° C.

US2006/0263547 discloses light diffusing films, methods of making the same and articles using the same. In one embodiment, a light diffusing film is formed from a composition comprising: a polycarbonate, phosphite stabilizer, epoxy stabilizer, hindered phenol stabilizer, and light diffusing particles having a refractive index of about 1.3 to about 1.7.

The film comprises a hiding power of 0 to about 0.5. In one embodiment, a method for producing a film comprises combining a polycarbonate, a phosphite stabilizer, an epoxy stabilizer, and light diffusing particles to form a combination, and forming the combination into the film.

US 2014/0350148 discloses an aromatic polycarbonate resin composition, comprising 100 parts by mass of an aromatic polycarbonate resin (A), 0.005 to 0.5 parts by mass of a diphosphite compound (B) represented by formula (I) and 0.001 to 0.5 parts by mass of an alicyclic epoxy compound (C):

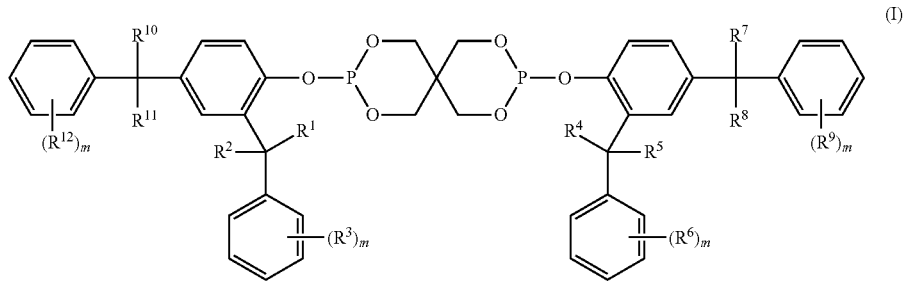

(I)

wherein in the formula (I),

R1, R2, R4, R5, R7, R8, R10, and R11 each independently represent a hydrogen atom or an alkyl group having 1 to 4 carbon atoms that may have a substituent, R3, R6, R9, and R12 each independently represent a group selected from the group consisting of an alkyl group having 1 to 4 carbon atoms, an aryl group having 6 to 12 carbon atoms, and an aralkyl group having 7 to 12 carbon atoms, and each m independently represents an integer of 0 to 3. This document further discloses that it is possible to include a modified silicone compound. More in particular it is disclosed that a modified silicone compound can be incorporated into the resin composition as required. The said modified silicone compound has at least one of functional group selected from an alkoxy group, a vinyl group, and a phenyl group, and is preferably, for example, a functional group-containing modified silicone compound (such as an organosiloxane) obtained by introducing at least one of group selected from a methoxy group, a vinyl group, and a phenyl group into a silicone compound. The modified silicone compound serves to further improve the heat stability of the composition at the time of its molding; for example, the compound prevents external appearance failures such as yellowing and silver (silver streak) due to thermal deterioration at the time of the molding, and the inclusion of air bubbles. The content of the modified silicone compound can be preferably selected from the range of 0.01 to 1 parts by mass with respect to 100 parts by mass of the aromatic polycarbonate resin (A) as appropriate.

U.S. Pat. No. 4,066,611 discloses a stabilized polycarbonate composition comprising in admixture an aromatic carbonate polymer and a stabilizing amount of a cyclic diphosphite. The composition may additionally contain co-stabilizers such as epoxides or silanes.

US 2015/0070933 discloses illuminating devices having plastic light-transmitting article(s) formed from a thermoplastic composition including a polycarbonate having repeating structural carbonate units according to the formula:

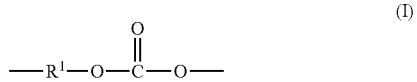

(I)

in which at least 60 percent of the total number of $R^1$ groups contain aromatic moieties and the balance thereof are aliphatic, alicyclic, or aromatic. The composition also includes an epoxy additive having at least two epoxy groups per molecule and a phenolic diphosphite derived from pentaerythritol. The thermoplastic composition exhibits a dE (2000 hrs.) value of less than 1.5 after 2000 hours of heat aging at 130° C., measured according ISO 11664-4:2008 (E)/CIE S 014-4/E: 2007 using CIE illuminant D65 and a 2.5 mm thick molded plaque of the thermoplastic composition.

In an injection moulding process the cycle time can be influenced inter alia by setting the temperature of the mould. That is, the lower the mould temperature, the quicker the injection moulded part is cooled to a temperature at which it is dimensionally stable and hence the quicker it can be released from the mould. There are however limitations to this temperature setting in that a mould that is too cold may result in a moulded article that does not have the desired dimensions. For example as a result of the mould temperature the thermoplastic material to be moulded may solidify before the mould is completely filled. Also, as a result of shrinkage of the thermoplastic material a moulding may be obtained that does not correspond accurately to the dimensions of the mould. A counter measure that can be taken to overcome this problem at least in part is to increase the holding pressure and/or the time that the holding pressure is applied in the injection moulding process. However, for complex mouldings with long flow lengths this counter measure is less effective as the holding pressure is introduced at the injection point of the mould. Thus, in particular for such complex mouldings there is always a tradeoff between dimensional accuracy and injection moulding cycle time.

A problem that is obtained with certain polycarbonate compositions, in particular those that comprise a phenolic diphosphite derived from pentaerythritol as a stabiliser is that upon injection moulding of more complex parts there is a risk of bubble, or void, formation inside the moulded article. Such voids are highly undesirable as they jeopardise the aesthetics of the article and may even affect its mechanical properties. In the context of the present invention the terms bubbles and voids may be used interchangeably. Formation of voids is found in particular at portions remote from the injection point. Without willing to be bound to it the present inventors believe that this is due to relatively low pressure of the moulded material, and during the injection moulding process, near these remote positions.

Since an increase in injection moulding pressure is not always possible and/or is not very effective and since a higher mould temperature is less desirable in view of longer cycle times there is hence a need for a material to be used for complex injection moulding parts which does not give rise to formation of bubbles.

The present invention is therefore directed to the use of a polycarbonate composition comprising aromatic polycarbonate in an injection moulding process for the manufacture of an injection moulded article, for reducing the formation of bubbles in said injection moulded article The present inventors have found that a composition comprising an aromatic polycarbonate, from 0.01 wt. % to 0.30 wt. % of an epoxy additive having at least two epoxy groups per molecule and from 0.01 wt. % to 0.30 wt. % of a phenolic diphosphite derived from pentaerythritol is suitable for that purpose and, compared to a composition not having this combination of materials results in significantly less or even no bubble formation.

Thus the present invention is directed at the use of a polycarbonate composition comprising
aromatic polycarbonate manufactured by an interfacial process and having a melt volume rate (MVR) of from 1-10 cm$^3$/10 min (ISO 1133, 300° C., 1.2 kg)
from 0.01 wt. % to 0.30 wt. % based on the weight of the polycarbonate composition, of an epoxy additive having at least two epoxy groups per molecule
from 0.01 wt. % to 0.30 wt. % based on the weight of the polycarbonate composition, of a phenolic diphosphite derived from pentaerythritol
in an injection moulding process for the manufacture of an injection moulded article, for reducing the formation of bubbles in said injection moulded article. It is preferred that the polycarbonate composition does not contain a silicone compound.

BRIEF DESCRIPTION OF THE DRAWINGS

Referring now to the figures, which are exemplary aspects.

Figure 1:
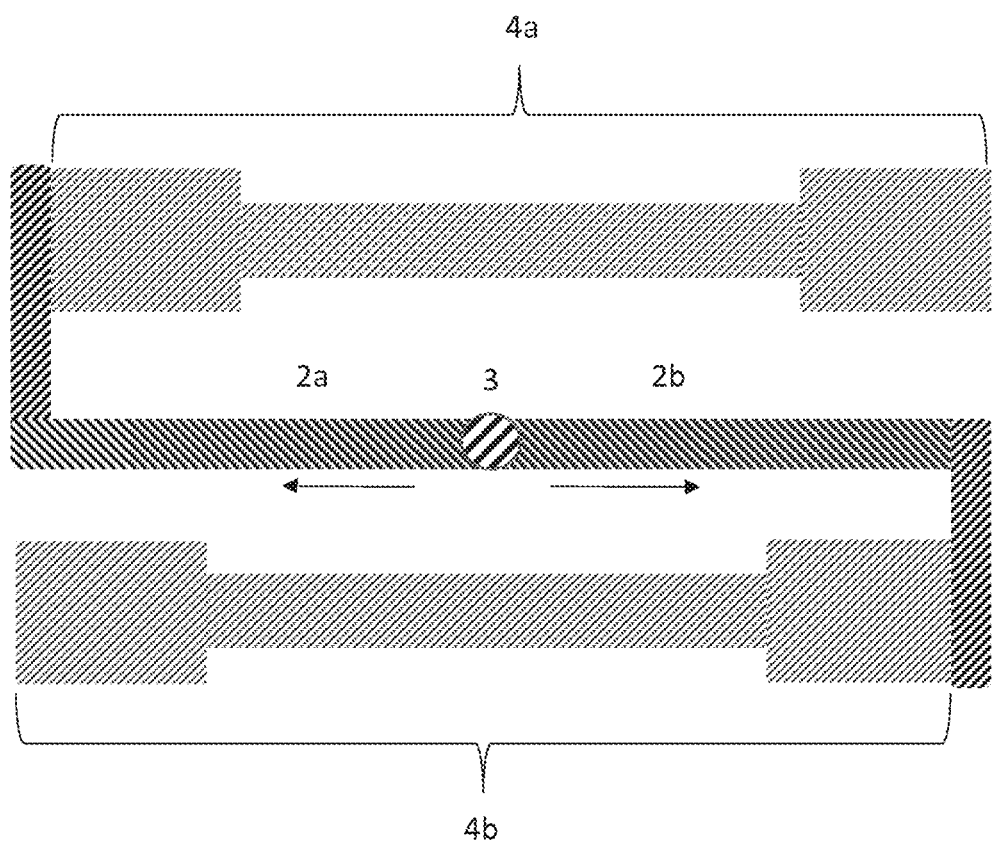
FIG. 1 is a schematic illustration of a test piece.

More in particular it is preferred that the present invention is directed at the aforementioned use wherein the polycarbonate composition does not contain a modified silicone having at least one of functional group selected from an alkoxy group, a vinyl group, and a phenyl group, and which is preferably, for example, a functional group-containing modified silicone compound (such as an organosiloxane) obtained by introducing at least one of group selected from a methoxy group, a vinyl group, and a phenyl group into a silicone compound and wherein the content of the modified silicone compound is preferably in the range of from 0.01 to 1 parts by mass with respect to 100 parts by mass of the aromatic polycarbonate Since the problem with bubble formation is of particular relevance for more complex mouldings the present invention is in particular applicable to a moulding process wherein a flow length of the polycarbonate composition in an injection mould is at least 50 cm, the flow length being defined as the distance the molten polycarbonate composition travels in a mould from a point of injection in said mould. Or, with reference to the actual mould, the flow length may be defined as the shortest distance between a point of injection in the mould and an inner mould wall. The flow length is not limited to lengths in a single geometrical plane. For example, if the moulded object is a table and the injection point of the mould corresponds to the middle of the table then the flow length from the injection point to the lowest part of the table leg includes the length of the table leg as well as the distance between the start of the table leg and the center of the table.

The injection moulded article may be configured for virtually any application such as, for example, computer and business machine housings such as housings for monitors, handheld electronic device housings such as housings for cell phones, electrical connectors, and components of lighting fixtures, ornaments, home appliances, roofs, greenhouses, sun rooms, swimming pool enclosures, and the like. Additionally, the thermoplastic composition may be used for applications such as illuminant lenses or covers (including light emitting diode (LED) illuminants), light guides, edge-lit display panels, optical fibers, transparent sheets, diffusive sheets, display films, or articles of furniture.

Preferably the injection moulded article is an article of furniture such as a chair, stool, couch, or a table. The article of furniture may be for household or office use. The article of furniture may have a seat leg, stool leg or table leg of at least 20 cm, preferably at least 30 cm, more preferably at least 40 cm. In an embodiment the use of the polycarbonate composition excludes the use for toy furniture.

As mentioned above, the thermoplastic composition includes an aromatic polycarbonate, meaning a polycarbonate having aromatic groups in its backbone. Such polycarbonates are well known in the art and described in detail for example in WO 2014/191942. The polycarbonate according to the present invention may be a homopolymer or a copolymer, a homopolymer being preferred. The method for the manufacture of the polycarbonate is not limited and both polycarbonates manufactured according to the interfacial process as polycarbonates manufactured using the melt process may be suitable for the present invention. The present invention is not particularly limited with respect to the molecular weight or molecular weight distribution of the polycarbonate. It is however preferred that the melt volume rate (MVR) is at most 10 cm$^3$/10 min (300° C., 1.2 kg) as determined in accordance with ISO 1133. Preferably the MVR is from 0.1-10, more preferably 1-10 cm$^3$/10 min. The MVR may be from 2-9 or 5-9 cm$^3$/10 min.

In view of better color, the polycarbonates described herein are preferably manufactured by interfacial polymerization. Although the reaction conditions for interfacial polymerization can vary, the process generally involves dissolving or dispersing a dihydric phenol, such as bisphenol A (BPA) reactant in aqueous caustic soda or potash, adding the resulting mixture to a water-immiscible solvent medium, and contacting the reactants with a carbonate precursor in the presence of a catalyst such as triethylamine and/or a phase transfer catalyst, under controlled pH conditions, e.g., 8 to 12. The most commonly used water immiscible solvents include methylene chloride, 1,2-dichloroethane, chlorobenzene, toluene, and the like. Carbonate precursors include a carbonyl halide such as carbonyl bromide or carbonyl chloride, or a haloformate such as a bishaloformates of a dihydric phenol (e.g., the bischloroformates of bisphenol A, hydro quinone, or the like) or a glycol (e.g., the bishaloformate of ethylene glycol, neopentyl glycol, polyethylene glycol, or the like). Combinations comprising at least one of the foregoing types of carbonate precursors can also be used. Phosgene can also be a carbonate precursor in, an interfacial polymerization reaction to form carbonate linkages, which is referred to as a phosgenation reaction. It is preferred to manufacture the polycarbonate of the present invention using the interfacial polymerization of bisphenol A and phosgene.

The composition of the invention comprises from 0.01-0.30 wt. % based on the weight of the composition of an epoxy additive having at least two epoxy groups per molecule. Preferably, the epoxy additive is a carboxylate epoxy resin, more preferably an aliphatic epoxide having at least two epoxy groups per molecule and a molecular weight lower than 600 g/mol. Epoxy compounds useful as additives include epoxy modified acrylic oligomers or polymers (such as a styreneacrylate-epoxy polymer, prepared from for example a combination of: a substituted or unsubstituted styrene such as styrene or 4-methylstyrene; an acrylate or methacrylate ester of a $C_{1-22}$ alkyl alcohol such as methyl acrylate, methyl methacrylate, ethyl acrylate, butyl acrylate, or the like; and an epoxy-functionalized acrylate such as glycidyl acrylate, glycidyl methacrylate, 2-(3,4-epoxycyclohexyl)ethyl acrylate, 2-(3,4-epoxycyclohexyl)ethyl methacrylate, or the like), or an epoxy carboxylate oligomer based on cycloaliphatic epoxides (such as, for example, 3,4-epoxycyclohexylmethyl-3,4-epoxycyclohexylcarboxylate, or the like).

The epoxy additive may comprise an additional functional group such as hydroxyl, carboxylic acid, carboxylic acid ester, and the like. More than one functional group may be present. Specific examples of the epoxy stabilizer include epoxidized soybean oil, epoxidized linseed oil, phenyl glycidyl ether, allyl glycidyl ether, tert-butylphenyl glycidyl ether, 3,4-epoxycyclohexylmethyl-3,4'-epoxy cyclohexyl carboxylate, 3,4-epoxy-6-methylcylohexylmethyl-3',4'-epoxy-6'-methylcyclohexyl carboxylate, 2,3 epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexylethyleneoxide, cyclohexylmethyl-3,4-epoxycyclohexyl carboxylate, 3,4 epoxy-6-methylcyclohexylmethyl-6'methylcyclohexyl carboxylate, bisphenol A glycidyl ether, tetrabromobisphenol A glycidyl ether, diglycidyl phthalate, diglycidyl hexahydrophthalate, bisepoxydicyclopentadienyl ether, bis-epoxyethylene glycol, bis-epoxycyclohexyl adipate, butadiene diepoxide, tetraphenylethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5 tert-butyl-1,2-epoxycyclohexane, octadecyl-2,2-dimethyl 3,4-epoxycyclohexyl carboxylate, N-butyl-2,2-dimethyl-3,4-epoxycyclohexyl carboxylate, cyclohexyl-2-methyl-3,4 epoxycyclohexyl carboxylate, N-butyl-2-isopropyl-3,4 epoxy-5-methylcyclohexyl carboxylate, octadecyl-3,4 epoxycyclohexyl carboxylate, 2-ethylhexyl-3',4' epoxycyclohexyl carboxylate, 4,6-dimethyl-2,3 epoxycyclohexyl-3',4'-epoxycyclohexyl carboxylate, 4,5 epoxytetrahydrophthalic anhydride, 3-tertbutyl-4,5 epoxytetrahydrophthalic anhydride, diethyl-4,5-epoxy-cis 1,2-cyclohexyl dicarboxylate, and di-n-butyl-3-tertbutyl-4,5-epoxy-cis-1,2-cyclohexyl dicarboxylate. The epoxy compounds can be used singly or in combination. Of these, epoxy carboxylates such as alicyclic epoxy carboxylates (e.g., 3,4-epoxycyclohexylmethyl-3" 4'-epoxycyclo hexyl carboxylate) can be used.

Preferably the epoxy additive is a carboxylate epoxy resin and more preferably the epoxy additive is a carboxylate epoxy resin comprising a carboxylate diepoxide according to the formula:

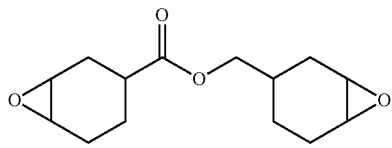 [SMILES: O=C(OCC1CCC2OC2C1)C1CCC2OC2C1]

Specific commercially available exemplary epoxy functionalized stabilizers include Cycloaliphatic Epoxide Resin ERL-4221 supplied by Union Carbide Corporation (a subsidiary of Dow Chemical), Danbury, Conn.; and epoxy functional acrylic (co)polymers such as JONCRYL® ADR-4300 and JONCRYL® ADR-4368, available from BASF Corporation, Sturtevant, Wis. The epoxy additive can be used in different amounts, for example from 0.01 to 0.25 wt. %, more specifically from 0.02 wt. % to 0.10 wt. %, based on the weight of the thermoplastic composition.

The thermoplastic composition also comprises from 0.01-0.30 wt. % based on the weight of the composition, of a phenolic diphosphite derived from pentaerythritol. Preferably the phenolic diphosphite is a compound according to the formula:

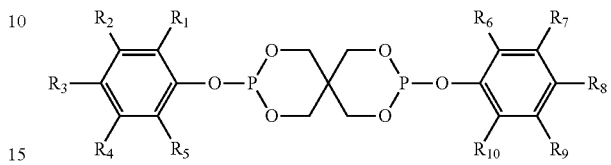

wherein $R_1$, $R_2$, $R_3$, $R_4$, $R_5$, $R_6$, $R_7$, $R_8$, $R_9$, and $R_{10}$ each independently represents hydrogen or a $C_{1-20}$ organic radical. In some embodiments, the position on the phenolic phenyl group to which the oxygen is attached is hindered, for example at the ortho and para positions. With respect to the above formula, for example, in some embodiments $R_2$, $R_4$, $R_5$, $R_7$, $R_9$, and $R_{10}$ are H and $R_1$, $R_3$, $R_6$ and $R_8$ each independently represents a $C_{1-20}$ organic radical, more specifically an alkaryl radical of 4 to 13 carbon atoms such as cumyl (e.g., bis(2,4-dicumyl)pentaerythritol diphosphite). Examples of phenolic diphosphites are disclosed in U.S. Pat. Nos. 5,364,895, 5,438,086, 6,613,823, the disclosures of which are incorporated herein by reference in their entirety. Phenolic diphosphites are also available commercially, e.g. under the Doverphos* brand, e.g., Doverphos* S-9228 and from ADK palmarole (e.g. ADK STAB PEP-36). The phenolic diphosphite is preferably (2,4-dicumylphenyl) pentaerythritol diphosphite.

The phenolic diphosphite can be present in the thermoplastic composition at different levels, for example, 0.02 wt. % to 0.30 wt. %, more specifically from 0.05 wt. % to 0.15 wt. %, based on the weight of the thermoplastic composition.

In an aspect the present invention is directed at the use of a polycarbonate composition comprising
  aromatic polycarbonate manufactured by the interfacial polymerisation of bisphenol A and phosgene and having a melt volume rate (MVR) of from 1-10 cm$^3$/10 min (ISO 1133, 300° C., 1.2 kg)
  from 0.01-0.30 wt. % of an epoxy additive of the formula

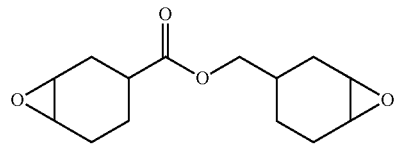 [SMILES: O=C(OCC1CCC2OC2C1)C1CCC2OC2C1]

from 0.01-0.30 wt. % of 2,4-dicumylphenyl) pentaerythritol diphosphite
  in an injection moulding process for the manufacture of an article of furniture.

It is preferred that the polycarbonate composition does not contain a silicone compound, in particular not a modified silicone compound.

The term furniture should be understood as including both household and office furniture thus excluding toy furniture. In this aspect of the present invention the article of (household and/or office) furniture may be a table, a chair, a stool, a couch a closet and the like. As the article of furniture is a household or office article of furniture, the table leg or seat leg is preferably at least 30, more preferably at least 50 cm, the couch height of at least 30 cm and the closet height at least 30 cm.

In the injection mould for moulding the polycarbonate composition a flow length is preferably at least 50 cm the flow length being defined as the distance the molten polycarbonate composition travels in a mould from a point of injection in said mould. Or, with reference to the actual mould, the term flow length may be defined as the shortest distance between a point of injection in the mould and an inner mould wall. In a preferred embodiment a flow length is at least 60 cm, at least 70 cm, at least 80 cm, at least 90 cm or at least 100 cm. The skilled person will understand that, moulds will have multiple flow lengths. Hence a mould may have flow lengths both shorter as longer than 50 cm. The present invention is directed specifically to moulds having at least one flow length longer than 50 cm.

For the avoidance of doubt the article prepared by injection moulding is an article that consists of the polycarbonate composition. It should be understood and recognised however that any article of furniture may be combined with further parts of further materials. For example, if the article is a chair then the chair may have arm legs padded with rubber or fabric material. Likewise the outer parts of seat legs or table legs may be provided with means for protecting either or both the leg or the surface on which the table, chair, stool or couch is used. For example rubber pads may be positioned on the outer edge of the legs for protection.

The thermoplastic composition may further comprise additional additives such as reinforcing agents, antioxidants, heat stabilizers, light stabilizers (including ultraviolet (UV) light stabilizers), plasticizers, lubricants, mould release agents, antistatic agents, surface effect additives, radiation stabilizers, flame retardants, and anti-drip agents. Combinations of additives can also be used.

The thermoplastic composition may further contain tinting colorants to achieve specifically targeted color space values. Colorants include, for example, anthraquinones, perylenes, perinones, indanthrones, quinacridones, xanthenes, oxazines, oxazolines, thioxanthenes, indigoids, thioindigoids, naphtalimides, cyanines, xanthenes, methines, lactones, coumarins, bisbenzoxaxolylthiophenes (BBOT), napthalenetetracarboxylic derivatives, monoazo and disazo pigments, triarylmethanes, aminoketones, bis(styryl)biphenyl derivatives, and the like, as well as combinations comprising at least two of the foregoing colorants.

The amount of colorant depends on the target color properties for the article, the spectral absorbance properties of the colorant(s), and the intrinsic color properties of the polycarbonate and any other materials or additives in the thermoplastic composition. The amount can vary, provided that it is kept below the level at which L* falls below a target specifications, in some embodiments an L* value of 95.65, in some embodiments an L* value of 95.75, and in some embodiments an L* value of 98.85. The L* value being a CIELAB 1976 color space value determined in accordance with ISO 11664-4:2008(E)/CIE S 014-4/E:2007 using CIE illuminant D65 and a 2.5 mm thick moulded plaque of the thermoplastic composition.

Exemplary amounts of colorant can range from 0.00005 to 0.01 parts by weight per 100 parts by weight of polycarbonate resin.

In a further aspect the present invention relates to a method for the manufacture of an injection moulded article in an injection mould comprising at least one flow length of at least 50 cm, the flow length being defined as the shortest distance between a point of injection in the mould and an inner mould wall, the method comprising injection moulding a polycarbonate composition comprising aromatic polycarbonate from 0.01 wt. % to 0.30 wt. % based on the weight of the polycarbonate composition, of an epoxy additive having at least two epoxy groups per molecule from 0.01 wt. % to 0.30 wt. % based on the weight of the polycarbonate composition, of a phenolic diphosphite derived from pentaerythritol.

Preferred embodiments for the method are similar to preferred embodiments for the use as disclosed herein. That is, by way of example, the injection moulded article is preferably an article of furniture preferably an article of household or office furniture such as a table, a chair, a stool or a couch.

Likewise it is preferred that the polycarbonate composition does not contain a silicone compound, in particular not a modified silicone compound In yet a further aspect the present invention relates to an article comprising or consisting of a polycarbonate composition comprising aromatic polycarbonate from 0.01 wt. % to 0.30 wt. % based on the weight of the polycarbonate composition, of an epoxy additive having at least two epoxy groups per molecule from 0.01 wt. % to 0.30 wt. % based on the weight of the polycarbonate composition, of a phenolic diphosphite derived from pentaerythritol, wherein the article is prepared by injection moulding of said composition and wherein at least one flow length of the polycarbonate composition in an injection mould is at least 50 cm, the flow length being defined as the shortest distance between a point of injection in the mould and an inner mould wall.

Preferred embodiments for the method are similar to preferred embodiments for the use as disclosed herein. By way of example the article preferably comprises or consists of a polycarbonate composition that comprises aromatic polycarbonate manufactured by an interfacial process and having a melt volume rate (MVR) of from 1-10 cm³/10 min (ISO 1133, 300° C., 1.2 kg), from 0.01-0.30 wt. % of an epoxy additive of the formula

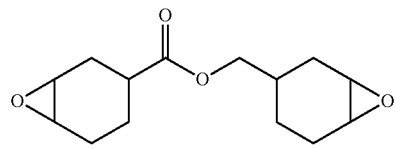 [SMILES: O=C(OCC1CCC2OC2C1)C1CCC2OC2C1]

from 0.01-0.30 wt. % of 2,4-dicumylphenyl pentaerythritol diphosphite.

The article is preferably an injection moulded article of furniture such as an article of household or office furniture such as a table, a chair, a stool or a couch, preferably a chair or a stool comprising a seat leg or stool leg of at least 20, preferably at least 30, more preferably at least 40 cm.

EXAMPLES

The following materials were used:

| | |
|---|---|
| PC | Polycarbonate homopolymer prepared with an interfacial process, having a molecular weight of about 30,000 g/mol (GPC using PC standards), a MFR of 6 g/10 min (ISO 1133, 300° C., 1.2 kg) |
| CAEP | Cycloaliphatic Epoxy Resin, 3,4-epoxycyclohexylmethyl-3,4-epoxycyclohexyl carboxylate |
| TDP | Irgaphos 168, tris(2,4,-di-t-butylphenyl) phosphite |
| S-9228 | Doverphos S-9228, bis(2,4-dicumyl)pentaerythritol diphosphite |
| Release | Palmitic/Stearic Acid (50/50) ester of dipentaerythritol |

Figure 2:
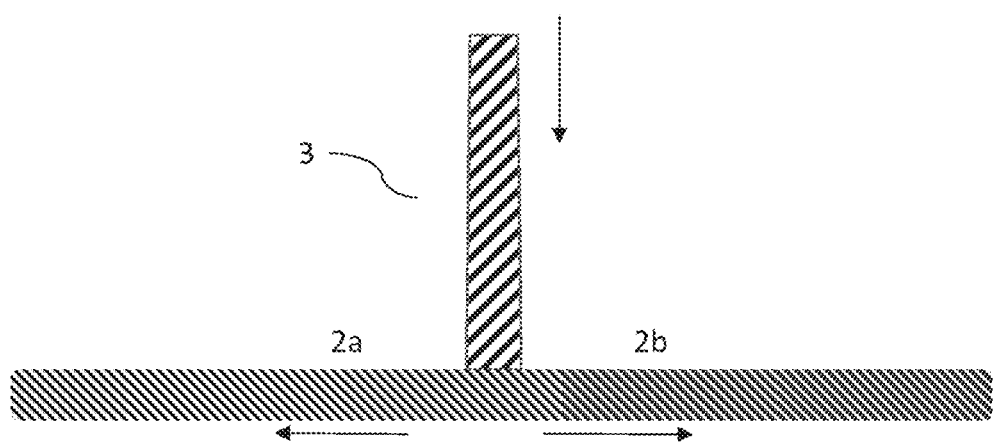
FIG. 2 is a schematic illustration of another test piece.

The compositions of all the examples were moulded into test parts using a custom mould for the manufacture of test pieces for tensile bars. FIGS. 1 and 2 schematically show the test pieces comprising the tensile bars 2a and 2b and runners 3, 2a and 2b. In the injection moulding process the polycarbonate composition flows along the direction as indicated by means of the arrows. The top part of introduction runner 3 in FIG. 2 corresponds to the position where molten polycarbonate composition is injected into the mould. In other words, this point is the point of injection of the polycarbonate composition. The introduction runner 3 is connected to runners 2a and 2b as schematically shown in FIGS. 1 and 2. Runners 2a and 2b and tensile bars 4a and 4b are identical in dimensions. The combined length of runners 3 and 2a is equal to the combined length of runners 3 and 2b and is about 190 mm. The diameter of runner 3 is 5.9 mm at the injection point and 7.7 mm at the point where it splits into runners 2a and 2b. Runners 2a and 2b have a flatted cone cross sectional shape with a straight base having a width of 8.1 mm and a height 5.5 mm. The diameter at the cone is around 7.5 mm. The tensile bars 4a and 4b have a standard thickness of 4 mm and fulfill the requirements of the ISO 527-2 standard.

Injection moulding was carried out with a melt temperature of 300° C. and the mould temperature was set at 70° C. The injection pressure was kept relatively low, yet sufficient to completely fill the mould. No holding pressure was applied. These conditions were found to simulate the pressure conditions that would apply near the outer ends of a mould for complex parts, such as for example the legs of a stool. The test pieces were visually inspected on the presence of voids.

The table below shows the samples that were made.

| | CE1 | CE2 | E1 | E2 | E3 | E4 | E5 | E6 | E7 |
|---|---|---|---|---|---|---|---|---|---|
| PC | 99.55 | 99.50 | 99.49 | 99.48 | 99.47 | 99.46 | 99.45 | 99.42 | 99.40 |
| CAEP | | 0 | 0.01 | 0.02 | 0.03 | 0.04 | 0.05 | 0.08 | 0.10 |
| TPP | 0.05 | | | | | | | | |
| S-9228 | | 0.10 | 0.10 | 0.10 | 0.10 | 0.10 | 0.10 | 0.10 | 0.10 |
| Release | 0.40 | 0.40 | 0.40 | 0.40 | 0.40 | 0.40 | 0.40 | 0.40 | 0.40 |
| Voids | + | + | +/− | − | − | − | − | − | − |

The amounts of the components are in weight percent on the basis of the composition. A "+" indicates the presence of voids in the material, whereas a "−" indicates no voids were observed.

As is clear from the table the combination of S-9228 as the diphosphite and CAEP results in mouldings that do not contain voids or at least mouldings wherein the void formation is reduced to a minimum. With respect to Example 1 it was observed that some samples contain voids where others did not.

The invention claimed is:

1. A method for the manufacture of an injection molded article in an injection mold comprising at least one flow length of at least 50 cm, the flow length being defined as the shortest distance between a point of injection in the mold and an inner mold wall, the method comprising injection molding a polycarbonate composition comprising:
   aromatic polycarbonate,
   from 0.01 wt. % to 0.30 wt. % based on the weight of the polycarbonate composition, of an epoxy additive having at least two epoxy groups per molecule, and
   from 0.01 wt. % to 0.30 wt. % based on the weight of the polycarbonate composition, of a phenolic diphosphite derived from pentaerythritol.

2. The method of claim 1, wherein the injection molded article is an article of furniture.

3. An article, comprising: a polycarbonate composition comprising
   aromatic polycarbonate,
   from 0.01 wt. % to 0.30 wt. % based on the weight of the polycarbonate composition, of an epoxy additive having at least two epoxy groups per molecule, and
   from 0.01 wt. % to 0.30 wt. % based on the weight of the polycarbonate composition, of a phenolic diphosphite derived from pentaerythritol,
   wherein the article is prepared by injection molding of said composition and wherein at least one flow length of the polycarbonate composition in an injection mold is at least 50 cm, the flow length being defined as the shortest distance between a point of injection in the mold and an inner mold wall.

4. The article of claim 3 wherein
   the aromatic polycarbonate is polycarbonate manufactured by an interfacial process and having a melt volume rate (MVR) of from 1-10 cm³/10 min (ISO 1133, 300° C., 1.2 kg),
   the epoxy additive is of the formula

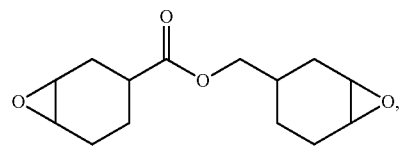 [SMILES: O=C(OCC1CCC2OC2C1)C1CCC2OC2C1]

and
   the phenolic diphosphite comprises 2,4-dicumylphenyl pentaerythritol diphosphite.

5. The article of claim 3, wherein said article is an injection molded article of furniture.

6. The article of claim 5, wherein the furniture is a table, a chair, a stool or a couch.

7. The article of claim 6, wherein the furniture is a chair or a stool comprising a seat leg or stool leg of at least 20 cm.

8. The article of claim 3, wherein the article consists of the polycarbonate composition.

9. The method of claim 1, wherein the polycarbonate composition does not contain a silicone compound.

10. The method of claim 8, wherein the epoxy additive is a carboxylate epoxy resin.

11. The method of claim 9, wherein the epoxy additive is an aliphatic epoxide having a molecular weight of at most 600 g/mol.

12. The method of claim 1, wherein the epoxy additive is of the formula:

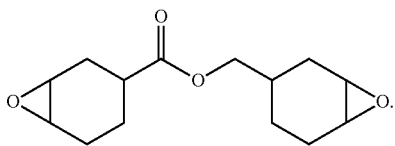 [SMILES: O=C(OCC1CCC2OC2C1)C1CCC2OC2C1]

13. The method of claim 1, wherein the phenolic diphosphite is according to the formula:

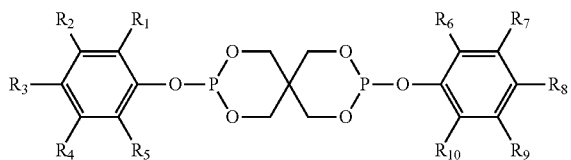

wherein $R_1$, $R_2$, $R_3$, $R_4$, $R_5$, $R_6$, $R_7$, $R_8$, $R_9$, and $R_{10}$ each independently represents hydrogen or a $C_{1-20}$ organic radical.

14. The method of claim 13, wherein $R_2$, $R_4$, $R_5$, $R_7$, $R_9$, and $R_{10}$ are H, and $R_1$, $R_3$, $R_6$ and $R_8$ each independently represents a $C_{1-20}$ organic radical.

15. The method of claim 1, wherein the epoxy additive is of the formula

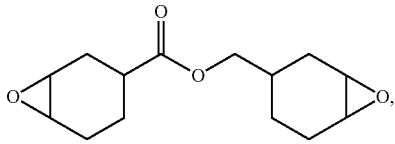 [SMILES: O=C(OCC1CCC2OC2C1)C1CCC2OC2C1]

and
wherein the phenolic diphosphite comprises 2,4-dicumylphenyl pentaerythritol diphosphite.

16. The method of claim 1, wherein the aromatic polycarbonate has an MVR of 5-9 cm$^3$/10 min as determined in accordance with ISO 1133 (300° C., 1.2 kg).

17. A method for the manufacture of an injection molded article in an injection mold comprising at least one flow length of at least 50 cm, the flow length being defined as the shortest distance between a point of injection in the mold and an inner mold wall, the method comprising injection molding a polycarbonate composition comprising:

aromatic polycarbonate having an MVR of 0.1-10 cm$^3$/10 min as determined in accordance with ISO 1133 (300° C., 1.2 kg), from 0.01 wt. % to 0.30 wt. % based on the weight of the polycarbonate composition, of an epoxy additive having at least two epoxy groups per molecule, and from 0.01 wt. % to 0.30 wt. % based on the weight of the polycarbonate composition, of a phenolic diphosphite derived from pentaerythritol;

wherein the polycarbonate composition does not contain a silicone compound, and wherein the epoxy additive is an aliphatic epoxide having a molecular weight of at most 600 g/mol.

18. The method of claim 17,
wherein the epoxy additive is of the formula

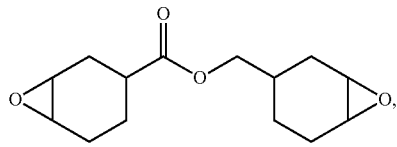 [SMILES: O=C(OCC1CCC2OC2C1)C1CCC2OC2C1]

and
wherein the phenolic diphosphite comprises 2,4-dicumylphenyl pentaerythritol diphosphite.

19. The method of claim 17, wherein the MVR is 2-9 cm$^3$/10 min as determined in accordance with ISO 1133 (300° C., 1.2 kg).

* * * * *